United States Patent [19]
Kanno

[11] Patent Number: 5,715,003
[45] Date of Patent: Feb. 3, 1998

[54] SINGLE LENS REFLEX CAMERA AND EXPOSURE METHOD FOR SAME

[75] Inventor: Kyusei Kanno, Tokyo, Japan

[73] Assignee: Asahi Kogaku Kogyo Kabushiki Kaisha, Tokyo, Japan

[21] Appl. No.: 515,137

[22] Filed: Aug. 15, 1995

[30] Foreign Application Priority Data

Aug. 24, 1994 [JP] Japan ................. 6-199269

[51] Int. Cl.⁶ ............... H04N 5/225; H04N 7/18
[52] U.S. Cl. ............ 348/341; 348/64; 396/447; 396/358
[58] Field of Search ............ 348/341, 340, 348/344, 335, 64; 396/385, 447, 354, 358

[56] References Cited

U.S. PATENT DOCUMENTS

| | | |
|---|---|---|
| 4,319,819 | 3/1982 | Lindenfelser ............ 396/385 |
| 4,461,557 | 7/1984 | Kimura . | 
| 4,659,202 | 4/1987 | Sadre-Marandi et al. ........ 396/358 |
| 4,750,012 | 6/1988 | Lindenfelser . |
| 5,481,324 | 1/1996 | Sekine ............ 396/354 |

FOREIGN PATENT DOCUMENTS 423042  1/1935  United Kingdom .
623375  5/1949  United Kingdom .

*Primary Examiner*—Andrew Faile
*Assistant Examiner*—Aung S. Moe
*Attorney, Agent, or Firm*—Kane,Dalsimer,Sullivan, Kurucz, Levy, Eisele and Richard, LLP

[57] ABSTRACT

A single lens reflex camera including a mirror-slit unit provided between a photographing lens and a recording medium and being provided with a pair of mirrors which can be selectively moved onto an optical axis of the photographing lens, and a slit provided between the mirrors; a reciprocally sliding mechanism which reciprocally moves the mirror-slit unit with respect to the recording medium, so that the slit gives the light to a picture area of the recording medium; and a photographing control mechanism which controls the reciprocally sliding mechanism, so that upon viewing, the mirrors of the mirror-slit unit are selectively moved onto the optical axis of the photographing lens so as to make the light incident upon a finder optical system, and upon photographing, the slit moves with respect to the picture area of the recording medium to make light, of an object to be photographed, incident upon the recording medium. The invention is also directed to an exposure method in the single lens reflex camera.

13 Claims, 6 Drawing Sheets

SINGLE LENS REFLEX CAMERA AND EXPOSURE METHOD FOR SAME

BACKGROUND OF THE INVENTION

1. Field of the Invention

The present invention relates to a single lens reflex camera and a monitoring camera which uses a single lens reflex camera. Also, the present invention relates to an exposure method for such a single lens reflex camera.

2. Description of Related Art

In a known single lens reflex camera, a mirror is provided in an optical path of light transmitted through a photographing lens system, and a focal plain shutter is provided behind the mirror. The mirror is made of a quick return mirror or a half mirror. The former type, i.e., the quick return mirror, is located in the optical path upon viewing, but is retracted from the optical path when a picture is taken. Consequently, upon the movement of the mirror, an image within the finder suddenly and temporarily disappears. On the other hand, no disappearance of an image occurs in the half mirror type optical system. However, in an optical system using a half mirror, only about half the quantity of light transmitted through the photographing lens system can reach a film, and hence, a bright lens must be used and thus the depth of field is reduced. Regardless of the disadvantages in either case, it is necessary to provide a focal plane shutter in conventional single lens reflex cameras.

There are in addition other serious problems when a single lens reflex camera, having a quick return mirror incorporated therein, is used for a monitoring camera. Namely, in a monitoring single lens reflex camera, an image of a finder system, reflected by a mirror, is picked up by a CCD camera, so that the image can be recorded by a VTR or viewed through a monitoring TV in a normal monitoring mode. On the other hand, in an emergency, the mirror is retracted from the optical path, so that the focal plane shutter is actuated to photograph a picture on a film. However, upon photographing, the image of the finder disappears and hence, the image of the VTR or monitoring TV also disappears (blackout). Accordingly, the number of frames of the VTR that can be used is decreased, and moreover, it is impossible to establish a precise time correlation between the images of the VTR and those formed on the film.

SUMMARY OF THE INVENTION

The primary object of the present invention is to provide a single lens reflex camera in which a focal plane shutter, which until now has been considered indispensable in known single lens reflex cameras, can be dispensed with.

Another object of the present invention is to provide a monitoring camera using a single lens reflex camera having no focal plane shutter, in which no image disappearance occurs in a finder optical system, even upon photographing.

Still another object of the present invention is to provide an exposure method for a single lens reflex camera having no focal plane shutter.

The basic concept of the present invention resides in the provision of a mirror-slit unit provided with a pair of mirrors which can be selectively moved onto an optical axis of the photographing lens so that a bundle of light transmitted through the photographing lens passes through the slit and moves on a picture area of the recording medium, and on the other hand, the mirrors on the opposite sides of the slit make the object light transmitted through the photographing lens incident upon the finder optical system. Thus, the mirror-slit unit functions not only as a shutter but also as a mirror.

According to the present invention, there is provided a single lens reflex camera comprising a mirror-slit unit provided between a photographing lens and a recording medium, said mirror-slit unit being provided with a pair of mirrors which can be selectively moved onto an optical axis of the photographing lens to make a bundle of light transmitted through the photographing lens incident upon a finder system, and a slit provided between the mirrors; a reciprocally sliding mechanism which reciprocally moves the mirror-slit unit in a plane parallel with the plane in which the mirrors lie, so that the bundle of light passed through the slit moves on a picture area of the recording medium; and, a photographing control mechanism which controls the reciprocally sliding mechanism, so that upon viewing, the mirrors of the mirror-slit unit are selectively moved onto the optical axis of the photographing lens, and upon photographing, the slit moves with respect to the picture area of the recording medium to make light, of an object to be photographed, incident upon the recording medium.

In a monitoring single lens reflex camera according to the present invention, a silver halide film is used as a recording medium and a TV camera using a solid state image pickup device (CCD) picks up an image of the finder system.

According to another aspect of the present invention, the mirrors and the slit on the mirror-slit unit are provided such that when the slit moves with respect to the picture area of the recording medium, the mirrors on the opposite sides of the slit make the object light, transmitted through the photographing lens, incident upon the finder system; a reciprocally sliding mechanism which reciprocally moves the mirror-slit unit in a plane parallel with the plane in which the mirrors lie, so that the bundle of light passed through the slit moves on a picture area of the film; and a photographing control mechanism which controls the reciprocally sliding mechanism, so that upon viewing, the mirrors of the mirror-slit unit are selectively moved onto the optical axis of the photographing lens so as to make light, of an object formed by the photographing lens, incident upon the finder optical system, and upon photographing, the slit moves with respect to the picture area of the film to make light, of object to be photographed, incident upon the film.

In a single lens reflex camera or a monitoring single lens reflex camera according to the present invention, the mirrors and the slit of the mirror-slit unit are provided such that when the slit moves substantially in parallel with the picture surface of the recording medium, the mirrors on the opposite sides of the slit make the object light transmitted through the photographing lens incident upon the finder system. Consequently, no disappearance of the whole image occurs in the finder system upon photographing. Preferably, the mirror-slit unit is moved in the direction in which there is no change in the distance between the mirror-slit unit and the recording medium to perform a uniform exposure of the whole image surface of the recording medium. The slit is elongated preferably in the direction parallel with the major side of the rectangular picture area of the recording medium, so that the exposure time can be shortened in comparison with the slit which is elongated in parallel with the minor side of the rectangular picture area.

The mirrors are inclined preferably at around 45 degrees with respect to the optical axis of the photographing lens, but the inclination angle can be any value other than 45 degrees.

Preferably, a single lens reflex camera further includes a speed control mechanism which controls the speed of the reciprocal movement of the mirror-slit unit, and/or a width adjusting mechanism which adjusts the width of the slit of the mirror-slit unit. With this arrangement, different exposures can be obtained.

In a monitoring single lens reflex camera according to the present invention, the direction of the scanning beams on an image pickup surface of the CCD camera can be determined such that the length of the slit is parallel with the direction of the scanning beams when the slit moves with respect to the picture area. Owing to the determination of the direction of the scanning beams as mentioned above, the TV picture plane is not entirely blacked out upon photographing a still picture, and hence, the image in the VTR can be used for analysis of data during photographing of a still picture. In particular, a precise correlation between the still picture and the VTR picture plane can be obtained.

The mirrors can be made of separate pieces to be independently movable so as to define therebetween a slit for exposure.

Namely, according to another aspect of the present invention, there is provided a single lens reflex camera comprising: a pair of mirrors, provided between a photographing lens and a recording medium, which can be selectively moved onto an optical axis of the photographing lens to make a bundle of light transmitted through the photographing lens incident upon a finder system, said pair of the mirrors defining a slit therebetween; a reciprocally sliding mechanism which reciprocally moves said pair of mirrors in a plane parallel with the plane in which the mirrors lie, so that the bundle of light passed through said slit moves on a picture area of the recording medium; and, a photographing control mechanism which controls the sliding mechanism, so that upon viewing, said pair of the mirrors are selectively positioned onto the optical axis of the photographing lens, and upon photographing, said pair of mirrors moves so that said slit between the pair of mirrors moves with respect to the picture area of the recording medium to make light, of object to be photographed, incident upon the recording medium.

According to a further aspect of the present invention, an exposure method for a single lens reflex camera including a pair of mirrors lying in the same plane and provided between a photographing lens and a recording medium, said mirrors being selectively moved onto an optical axis of the photographing lens to make a bundle of light, of an object, transmitted through the photographing lens incident upon a finder system includes the steps of:—moving the mirrors in a plane parallel with the plane in which the mirrors lie, so that a slit is defined between the mirrors; and, making the object light incident, through the slit, upon a picture area of the recording medium.

The width of the slit defined between the mirrors can be varied by setting the time of the movement of the mirror which moves later.

The present disclosure relates to subject matter contained in Japanese Patent Application No.06-199269(filed on Aug. 24, 1994) which is expressly incorporated herein by reference in its entirety.

BRIEF DESCRIPTION OF THE DRAWINGS

The invention will be described below in detail, with reference to the accompanying drawings, in which.

DESCRIPTION OF THE PREFERRED EMBODIMENT

Figure 1:
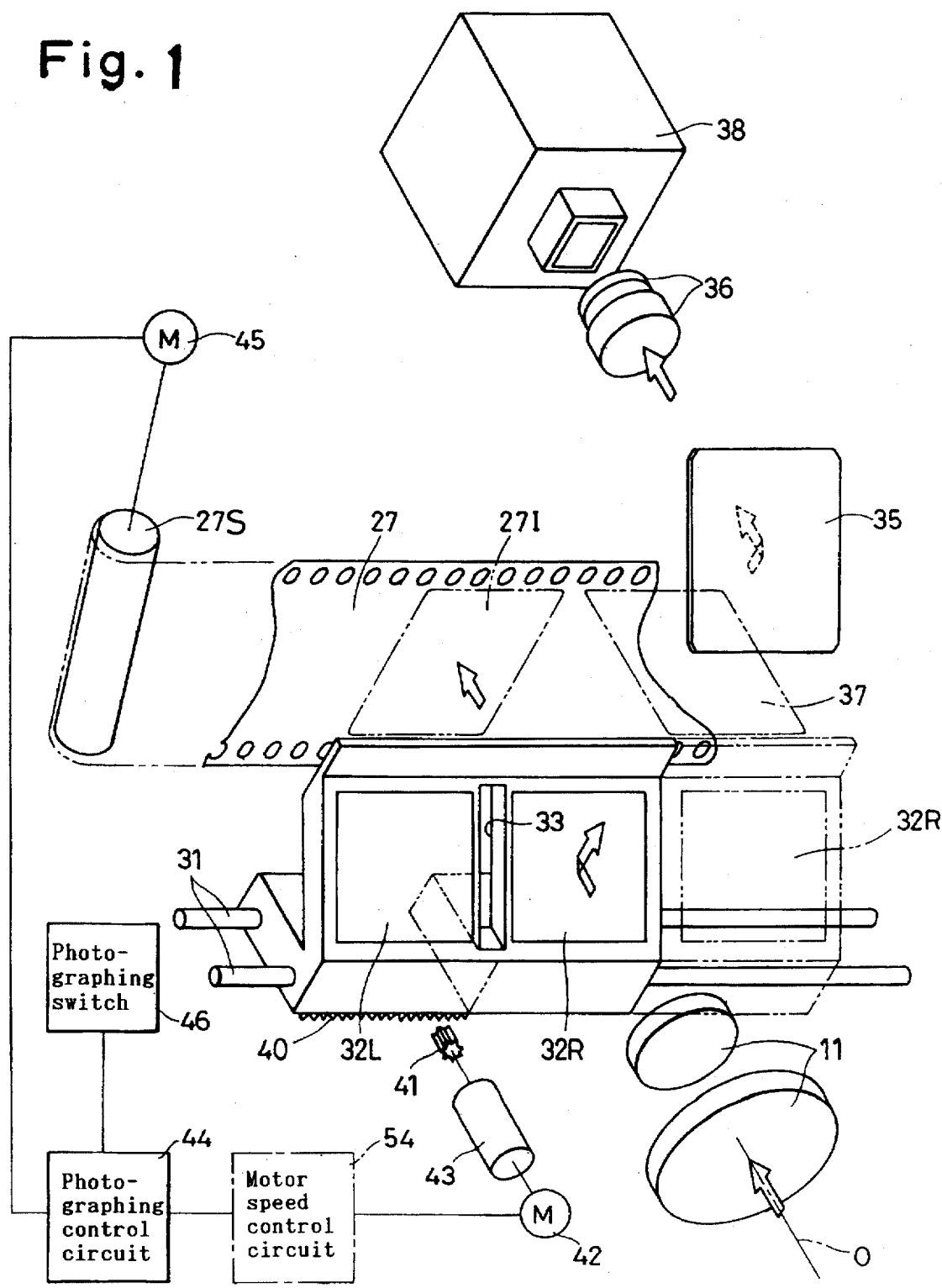
FIG. 1 is an exploded perspective view of main components of a monitoring single lens reflex camera according to the present invention.
Figure 2:
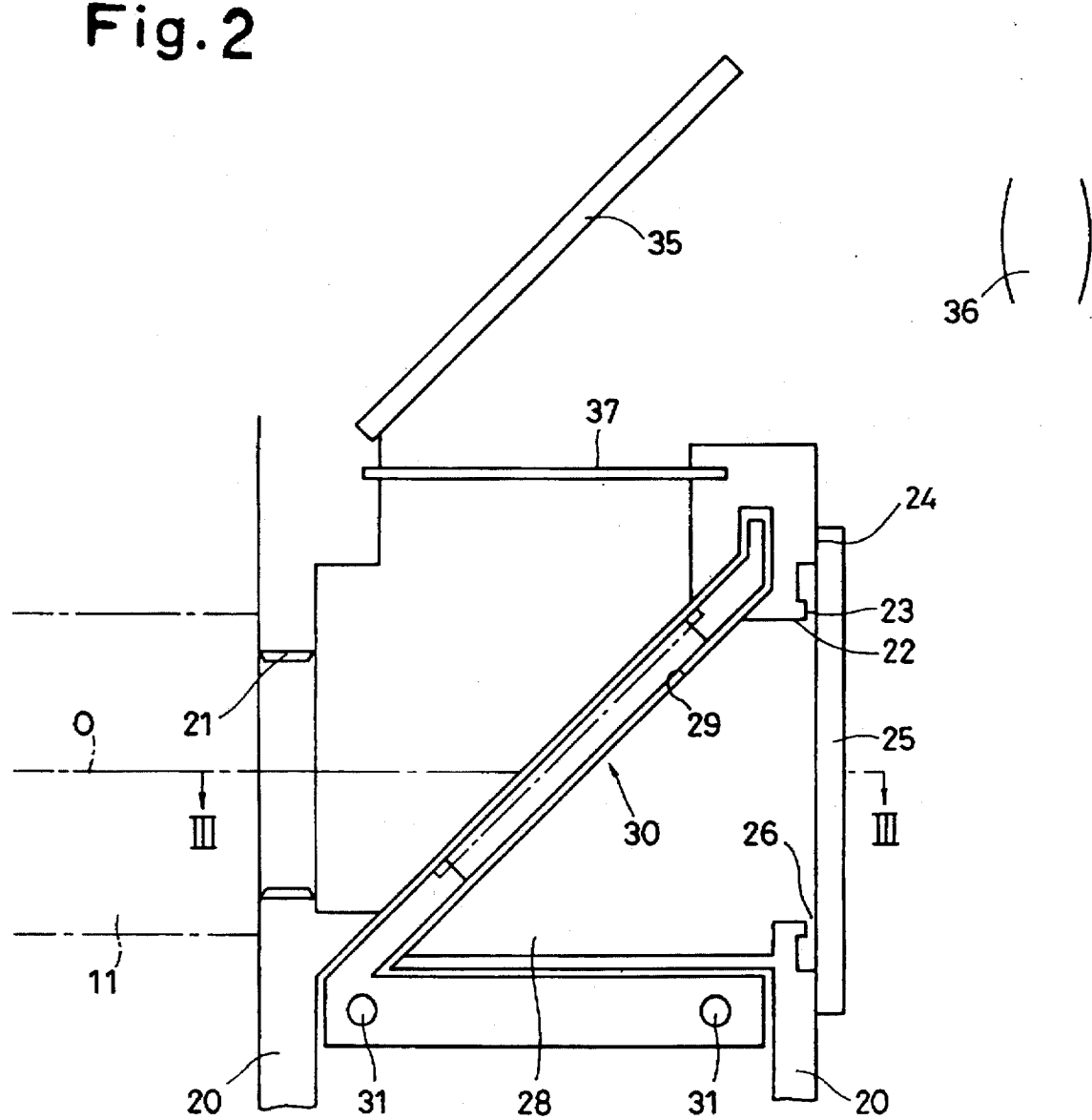
FIG. 2 is a longitudinal sectional view of a monitoring single lens reflex camera in an assembled state, according to the present invention.

Referring to FIGS. 1 through 4, a monitoring camera to which a single lens reflex camera is applied, according to the present invention, includes a camera body 20, which is provided with a body mount 21 to which a photographing lens 11 is detachably attached, and a photographing aperture 22 which is located on the optical axis O of the photographing lens 11. The aperture 22 defines the size of an image on a film. A pair of inner and outer rails 23 and 24 are provided behind the aperture 22. A back cover 25 abuts against the outer rail 24, so that a film tunnel 26 is defined between the inner rail 23 and the back cover 25. In conventional single lens reflex cameras, a focal plane shutter is provided in front of the film tunnel 26, but in the present invention, no focal plane shutter is provided.

The camera body 20 is provided therein with a mirror-slit unit 30 which is located between the body mount 21 and the aperture 22. The mirror-slit unit 30 is slidably attached to a pair of guide rails 31 which extend in a direction perpendicular to the optical axis O, without intersecting the same. Namely, the guide rails 31 are located below the optical axis O of the photographing lens 11. The mirror-slit unit 30 includes a pair of mirrors 32L and 32R and a slit 33 provided between the mirrors 32L and 32R. The mirrors 32L and 32R lie in the same plane, so that when the mirror-slit unit 30 moves, one of the mirrors 32L or 32R can be selectively located on the optical axis O. When the mirror 32L or 32R is located on the optical axis O, the mirror 32L or 32R is inclined at an angle of 45 degrees with respect to the optical axis O. The slit 33 moves across the bundle of light to be incident upon the picture area 27I of the film 27 which is located in the film tunnel 26 when the mirror-slit unit 30 is moved, and hence, the mirror-slit unit functions as a shutter to make the light of object transmitted through the photographing lens 11 incident upon the picture surface 27I of the film 27. The picture area 27I of the film 27 is defined by a 35 mm half-size in the illustrated embodiment. The slit 33 extends in a direction parallel with the major side of the picture area (image area). The film 27 is a 35-mm elongated film.

Figure 3:
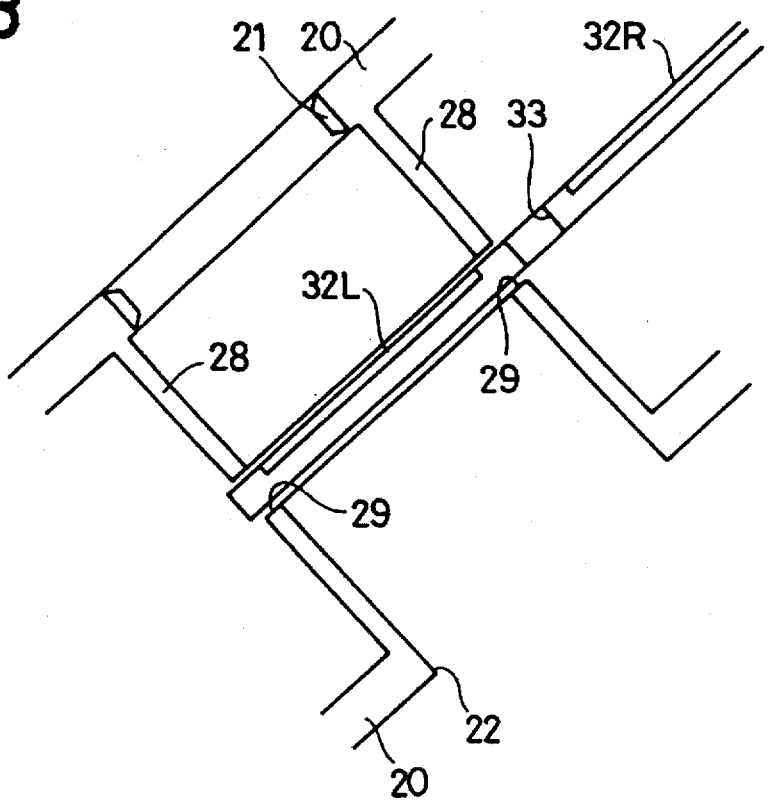
FIG. 3 is a sectional view taken along the line III—III in FIG. 2.

The camera body 20 is provided with a light intercepting cylinder 28 to optically isolate the space between the body mount 21 and the aperture 22. The cylinder 28 is provided with a hole 29 through which the mirror-slit unit 30 is movable in the light-tight state. As can be seen in FIG. 3, when one of the mirrors 32L or 32R of the mirror-slit unit 30 is located in the light intercepting cylinder 28, the other mirror 32R or 32L is located out of the light intercepting cylinder 28 and the slit 33 is also located out of the light intercepting cylinder 28. The slit 33 can be made of a through hole or a transparent member which lies in the same plane as the mirrors 32L and 32R.

The camera body 20 is provided with a stationary mirror 35 and a relay lens 36, that correspond to the mirror 32L or 32R, above the optical axis O of the photographing lens 11. The stationary mirror 35 and the relay lens 36 are adapted to form an image formed on a focusing glass 37, which is located at aequivalen optically equivalent to the film 27, onto a CCD camera 38. The scanning direction of the CCD camera 38 is determined such that the major side of the rectangular picture area 27I of the film 27 corresponds to the scanning direction in the TV picture plane. Namely, assuming that the scanning direction of the TV picture plane 39 of the CCD camera 38 is the direction (major direction) Y in FIG. 4, the image (black line) 39B of the slit 33 on the TV picture plane is parallel with the scanning direction Y when the slit 30 moves in a direction across the image surface 27I of the film 27.

The mirror-slit unit 30 is provided on the lower surface thereof with a rack 40 which is in mesh with a drive pinion 41. The drive pinion 41 is connected to a reversible motor 42 through a gear train 43 to linearly and reciprocally move the mirror-slit unit 30. The reversible motor 42 is controlled by a photographing control circuit 44. A position sensor (not shown) such as a limit switch or an encoder, etc., can be provided to detect the movement (position) of the mirror-slit unit 30. A film feeding motor 45, which rotates a film winding spool 27S of the film 27, is controlled by the photographing control circuit 44.

The operation of the monitoring single lens reflex camera, as constructed above, will be discussed below.

At a normal monitoring mode, the controller 44 moves one of the mirrors 32L or 32R of the mirror-slit unit 30, for example, the mirror 32R onto the optical axis O of the photographing lens 11. Consequently, the bundle of light of the object transmitted through the photographing lens 11 is reflected by the mirror 32R, so that the object image is formed on the focusing glass 37. The object image is picked up by the CCD camera 38 through the stationary mirror 35 and the relay lens 36. As mentioned above, the scanning direction of the CCD camera is such that the direction of the scanning beams of the TV picture plane meets the major side of the rectangular image area 27I of the film 27. The image picked up by the CCD camera 38 is viewed through the monitor TV and is recorded by the VTR. In this state, the slit 33 is located out of the image surface 27I, and accordingly, the film 27 is not exposed through the slit 33.

If the photographing switch 46 is turned ON in an emergency, the photographing control circuit 44 drives the reversible motor 42. Consequently, the drive pinion 41 is driven through the gear train 43 to move the mirror-slit unit 30. Namely, slit 33 is moved across the bundle of light to be incident upon the image area 27I, so that the object light transmitted through the photographing lens 11 is made incident upon the image area 27I through the slit 33. Namely, a still picture is taken. The photographing operation by the movement of the slit is the same as that using the focal plane shutter. When the slit 33 moves out of the image area 27I, the mirror 32R moves back onto the optical axis 0 of the photographing lens 11, so that the monitoring mode is established again. For a continuous photographing operation, the mirror-slit unit 30 is reciprocally moved in synchronization with the operation of the film feeding motor 45, so that pictures can be continuously taken. The feed of the film 27 is detected, for example, in accordance with the number of revolutions of a sprocket (not shown) which rotates in association with the film 27, as is well known.

Assuming that the width of the slit 33 is 5 mm and the speed of the sliding movement of the mirror-slit unit 30 is 250 mm/sec., an exposure time of about 1/50 second is obtained. In many cases, the change in the illuminance in the environment in which the monitoring camera is used is restricted, and hence, the record of an image in an emergency can be carried out even at the fixed exposure as mentioned above so long as a film of high latitude is used. The fixed exposure contributes to a simplification of the structure of a monitoring single lens reflex camera.

Figure 4:
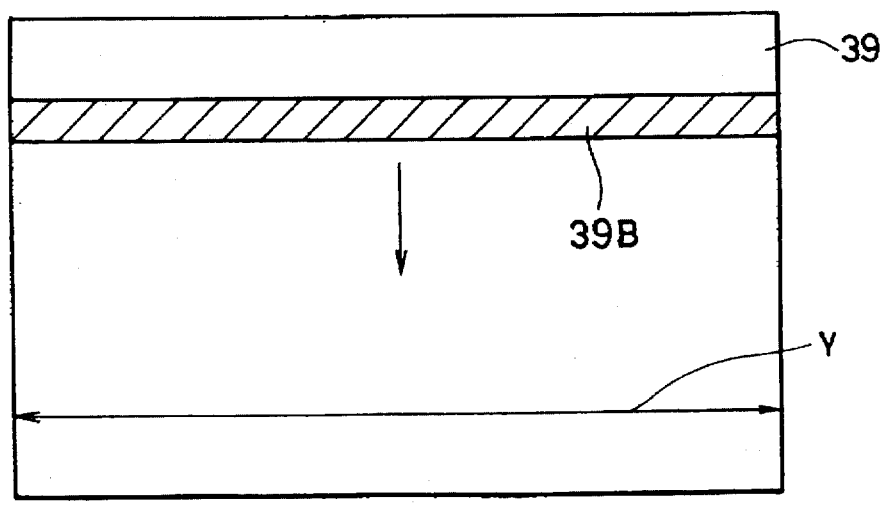
FIG. 4 is a front elevational view of a TV picture plane of a monitoring single lens reflex camera, shown in a blackout state.

Another advantage expected from the above-mentioned embodiment of the present invention is that the disappearance of a TV picture formed by the CCD camera 38, does not take place, even upon photographing a still picture. Namely, when the slit 33 of the mirror-slit unit passes over the image area 27I of the film 27, the object light transmitted through the photographing lens 11 does not reach the stationary mirror 35 at this time, but only after or before the passage of the slit 33, is the object light made incident upon the stationary mirror through the mirror 32L or 32R. Since the direction in which the slit 33 extends is identical to the direction of the scanning beams of the TV picture plane by the CCD camera 38, the blackout (disappearance) of the portion (width) of only those scanning beams corresponding to the slit 33, takes place as can be seen in FIG. 4. The blackout portion 39B moves in accordance with the movement of the slit 33.

Consequently, the VTR image during the photographing of the still picture can be used for analysis of data. In particular, the precise correlation between the still picture and the VTR picture plane can be obtained. In a conventional monitoring single lens reflex camera using a quick return mirror, the VTR picture plane entirely blacks out upon photographing a still picture, and no image can be used for the analysis of data. It can be easily understood that the present invention is remarkably advantageous in comparison with the prior art. Moreover, an operator can learn about the emergency when the black line (blackout portion) appears in the TV picture plane for the CCD camera 38.

The speed of the sliding movement of the mirror-slit unit 30 can be relatively slow, and this makes it possible to reduce the width of the slit 33, thus resulting in a reduction of the width of the blackout portion which appears on the TV picture plane. Furthermore, the slow movement of the mirror-slit unit 30 contributes to an improvement in durability and a reduction in noise.

Figure 5:
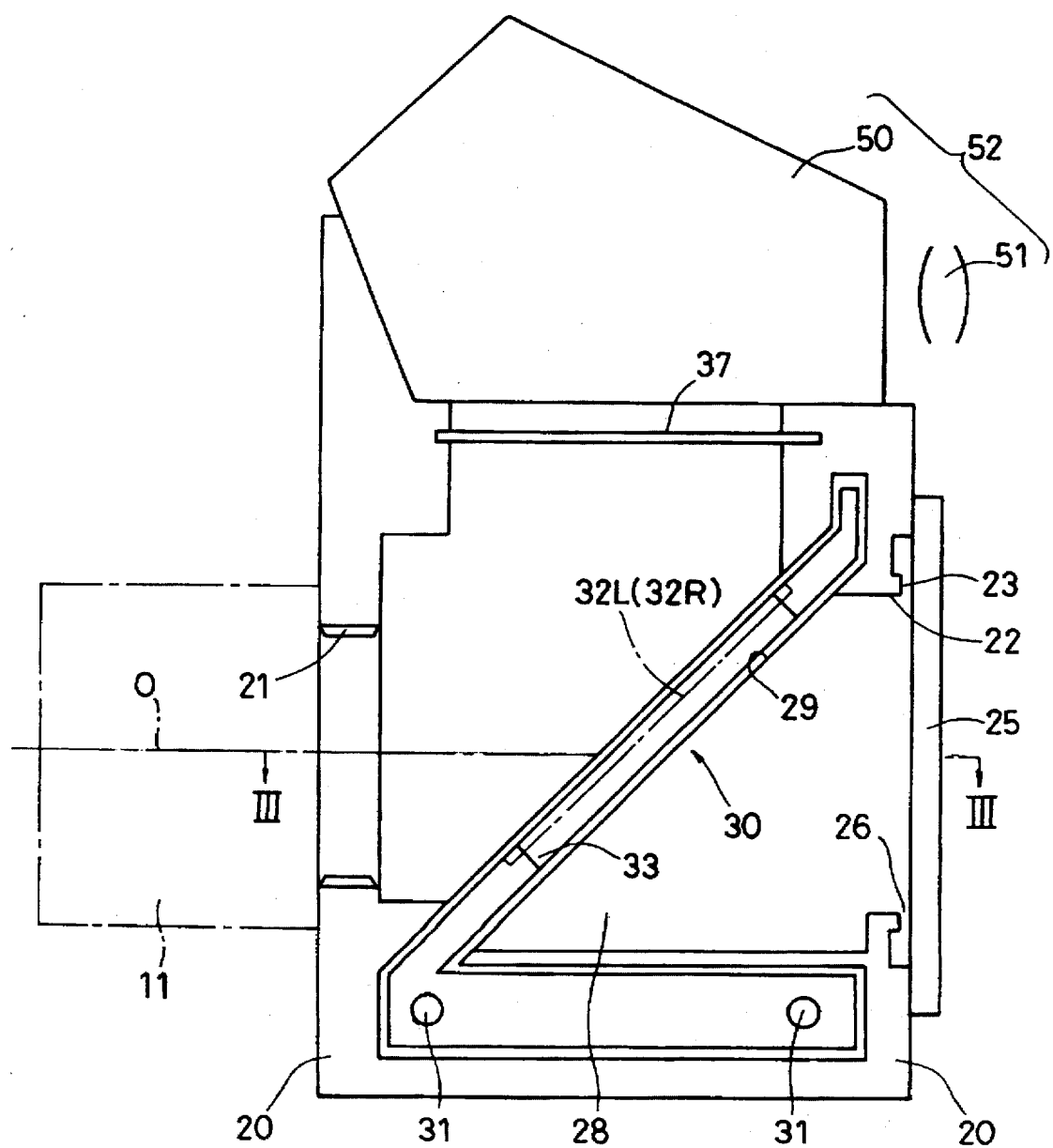
FIG. 5 is a longitudinal sectional view of a general single lens reflex camera to which the present invention is applied; and, FIG. 6 is a front elevational view of an adjusting apparatus which adjusts the width of a slit of a mirror-slit unit according to the present invention.

Although the above-mentioned embodiment is addressed to a monitoring camera, the present invention can be generally applied to a single lens reflex camera. FIG. 5 shows a modified embodiment applied to a general single lens reflex camera. In FIG. 5, there is a finder optical system 52 including a pentagonal daha (roof) prism or pentagonal daha (roof) mirror 50 and an ocular lens (eyepiece) 51, above the focusing glass 37.

It is possible to connect the motor speed control circuit 54 (FIG. 1) to the photographing control circuit 44 to compensate for different object illuminances. Moreover, it is possible to make the width of the slit variable to thereby control the exposure more precisely.

Figure 6:
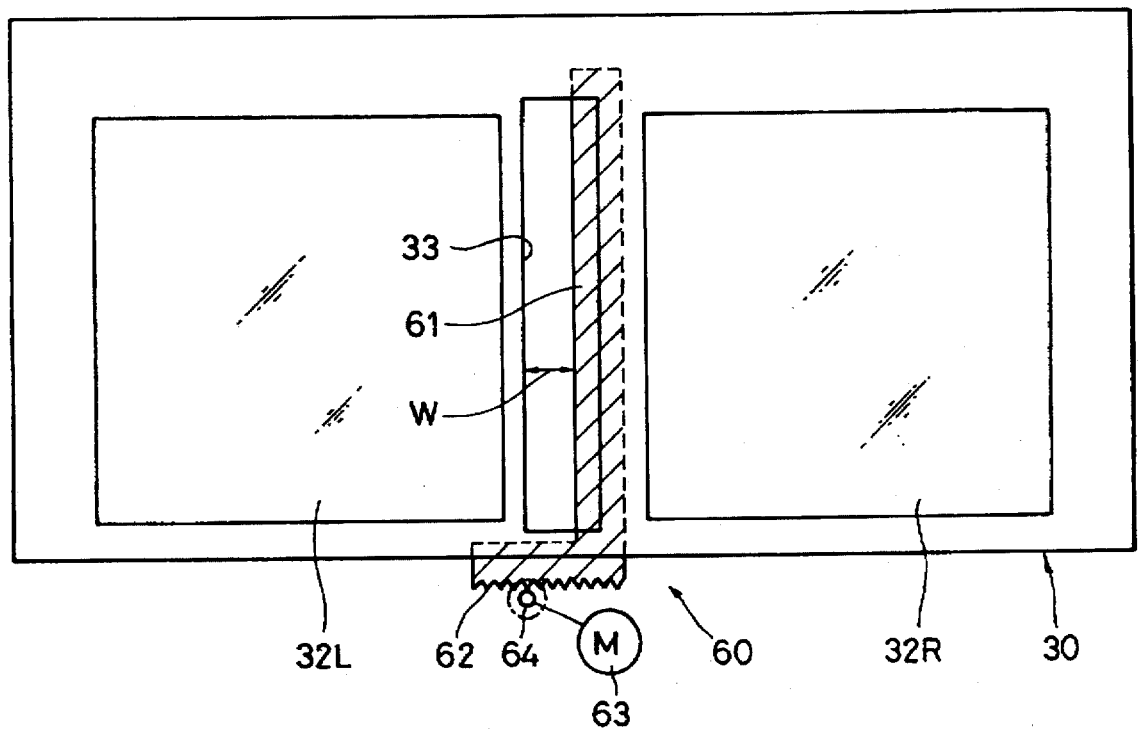

FIG. 6 shows a slit width varying or adjusting apparatus 60. The adjusting apparatus 60 includes a movable plate 61 provided on the stationary slit 33 of the mirror-slit unit 30. The movable plate 61 is hatched in FIG. 6. The slit is defined at one side thereof by the stationary slit 33 and at the other side by the movable plate 61. The movable plate 61 is provided on the lower end thereof with a rack 62 which is engaged by a pinion 64. The pinion is in turn driven by a pulse motor 63. Thus, the width W of the slit, defined by the stationary slit 33 and the movable plate 61, can be adjusted by driving the pulse motor 63 in accordance with the object illuminance information. Alternatively, it is possible to adjust the width W of the slit by varying the distance between the mirrors 32L and 32R.

Although for clarity the focusing glass 37 is located on the plane optically equivalent to the film plane, in the illustrated embodiment, it is possible to provide a condenser lens or Fresnel lens etc., in place of the focusing glass 37 particularly when the image of the finder system is picked up by the CCD camera 38.

Figure 7:
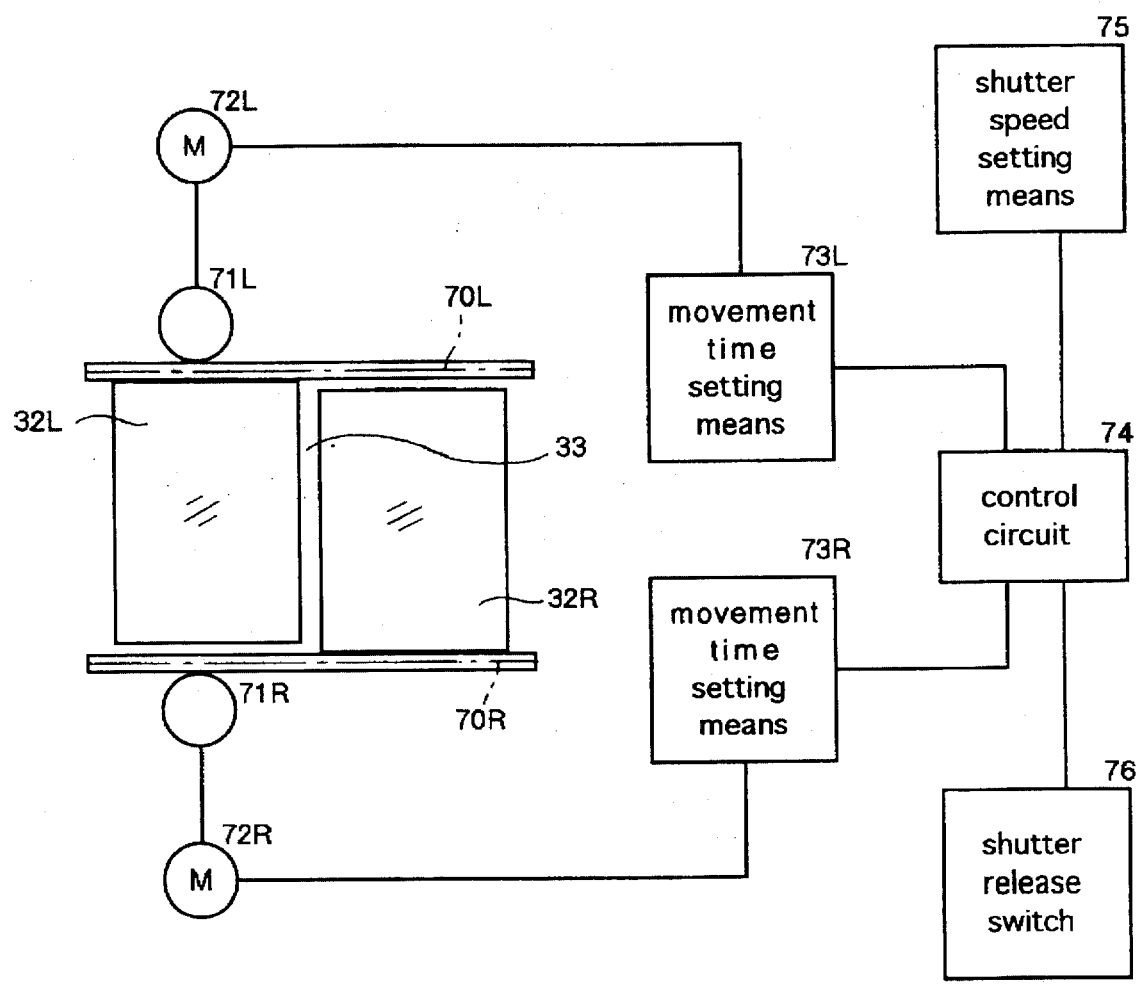
FIG. 7 is a front elevational view of a pair of mirrors which are independently movable and which form a slit therebetween, according to another aspect of the present invention.

FIG. 7 shows another embodiment of the present invention in which a pair of mirrors 32L and 32R are independently movable so that a slit 33 is formed between the mirrors 32L and 32R. Each of the mirrors 32L and 32R has a respective rack 70L and 70R which are in mesh with respective pinions 71L and 71R. The pinions 71L and 71R are driven by motors 72L and 72R through movement time setting means 73L and 73R and control circuit 74. The control circuit 74 and the movement time setting means 73L and 73R control the movement time of the motors 72L and 72R in accordance with a shutter speed set by a shutter speed setting means 75, upon issuance of a release signal from a shutter release switch 76. The width of the slit 33, i.e., the shutter speed, is thus controlled by the control circuit 74.

As can be understood from the above discussion, in a single lens reflex camera according to the present invention, the viewing state and the photographing state can be switched only by the reciprocal movement of the mirror-slit unit without using a focal plane shutter or a quick return mirror. Consequently, a charging mechanism for the mirror or the shutter, that has been considered indispensable is unnecessary, so that the whole structure of the single lens reflex camera can be simplified. Moreover, the durability of the camera is enhanced and noise can be attenuated. In addition, when the present invention is applied to a monitoring single lens reflex camera, little blackout occurs in the TV picture plane even when a still picture is photographed.

I claim:

1. A single lens reflex camera comprising:
   a mirror-slit unit provided between a photographing lens and a recording medium, said mirror-slit unit being provided with a pair of mirrors which can be selectively moved onto an optical axis of the photographing lens to make a bundle of light transmitted through the photographing lens incident upon a finder system, and a slit provided between the mirrors;
   a reciprocally sliding mechanism which reciprocally moves the mirror-slit unit in a plane parallel with the plane in which the mirrors lie, so that the bundle of light passed through the slit moves on a picture area of the recording medium; and,
   a photographing control mechanism which controls the reciprocally sliding mechanism, so that upon viewing, the mirrors of the mirror-slit unit are selectively positioned onto the optical axis of the photographing lens, and upon photographing, the slit moves with respect to the picture area of the recording medium to make light, of an object to be photographed, incident upon the recording medium.

2. The single lens reflex camera according to claim 1, wherein said mirrors and said slit on the mirror-slit unit are provided such that when the slit moves with respect to the picture area of the recording medium, the mirrors on the opposite sides of the slit make the object light transmitted through the photographing lens incident upon the finder system.

3. The single lens reflex camera according to claim 1, further comprising a speed control mechanism which controls the speed of the reciprocal movement of the mirror-slit unit.

4. The single lens reflex camera according to claim 1, further comprising a width adjusting mechanism which adjusts the width of the slit of the mirror-slit unit.

5. The single lens reflex camera according to claim 1, wherein said mirror-slit unit is moved in a direction in which there is no change in the distance between the mirror-slit unit and the recording medium.

6. The single lens reflex camera according to claim 1, wherein the slit of the mirror-slit unit is elongated in a direction parallel with the major side of a rectangular picture area of the recording medium.

7. The single lens reflex camera according to claim 1, wherein said mirrors of the mirror-slit unit lie in a same plane.

8. The monitoring single lens reflex camera comprising:
   a mirror-slit unit provided between a photographing lens and a film, said mirror-slit unit being provided with a pair of mirrors which can be selectively moved onto an optical axis of the photographing lens to make a bundle of light transmitted through the photographing lens incident upon a finder system, and a slit provided between the mirrors;
   a TV camera using a solid state image pickup device (CCD) which pickups an image of the finder system;
   a reciprocally sliding mechanism which reciprocally moves the mirror-slit unit in a plane parallel with the plane in which the mirrors lie, so that the bundle of light passed through the slit moves on a picture area of the film; and,
   a photographing control mechanism which controls the reciprocally sliding mechanism, so that upon viewing, the mirrors of the mirror-slit unit are selectively positioned onto the optical axis of the photographing lens so as to make light, of an object formed by the photographing lens, incident upon the finder optical system, and upon photographing, the slit moves, with respect to the picture area of the film, to make light, of an object to be photographed, incident upon the film.

9. The monitoring single lens reflex camera according to claim 8, wherein the direction of the scanning beams on an image pickup surface of the CCD camera is determined such that the length of the slit is parallel with the direction of the scanning beams when the slit moves with respect to the picture area.

10. A single lens reflex camera comprising:
    a pair of mirrors, provided between a photographing lens and a recording medium, which can be selectively moved onto an optical axis of the photographing lens to make a bundle of light transmitted through the photographing lens incident upon a finder system, said pair of mirrors defining a slit therebetween;
    a reciprocally sliding mechanism which reciprocally moves said pair of mirrors in a plane parallel with the plane in which the mirrors lie, so that the bundle of light, passed through said slit, moves on a picture area of the recording medium; and,
    a photographing control mechanism which controls the sliding mechanism, so that upon viewing, said pair of mirrors are selectively positioned onto the optical axis of the photographing lens, and upon photographing, said pair of mirrors moves so that said slit, between said pair of mirrors, moves with respect to the picture area of the recording medium to make light, of object to be photographed, incident upon the recording medium.

11. An exposure method for a single lens reflex camera including a pair of mirrors lying in the same plane and provided between a photographing lens and a recording medium, said mirrors being selectively moved onto an optical axis of the photographing lens to make a bundle of light of an object transmitted through the photographing lens incident upon a finder system, said method comprising the steps of:

moving the mirrors in a plane parallel with the plane in which the mirrors lie, so that a slit is defined between the mirrors; and, making the object light incident upon a picture area of the recording medium through the slit.

12. The exposure method according to claim 11, wherein the width of the slit defined between the mirrors can be varied by setting the time of the movement of the mirror which moves later.

13. The exposure method according to claim 12, wherein said mirrors are moved such that when the slit formed between the mirrors moves with respect to the picture area of the recording medium, the mirrors make the object light transmitted through the photographing lens incident upon the finder system.

* * * * *